Patented May 26, 1931

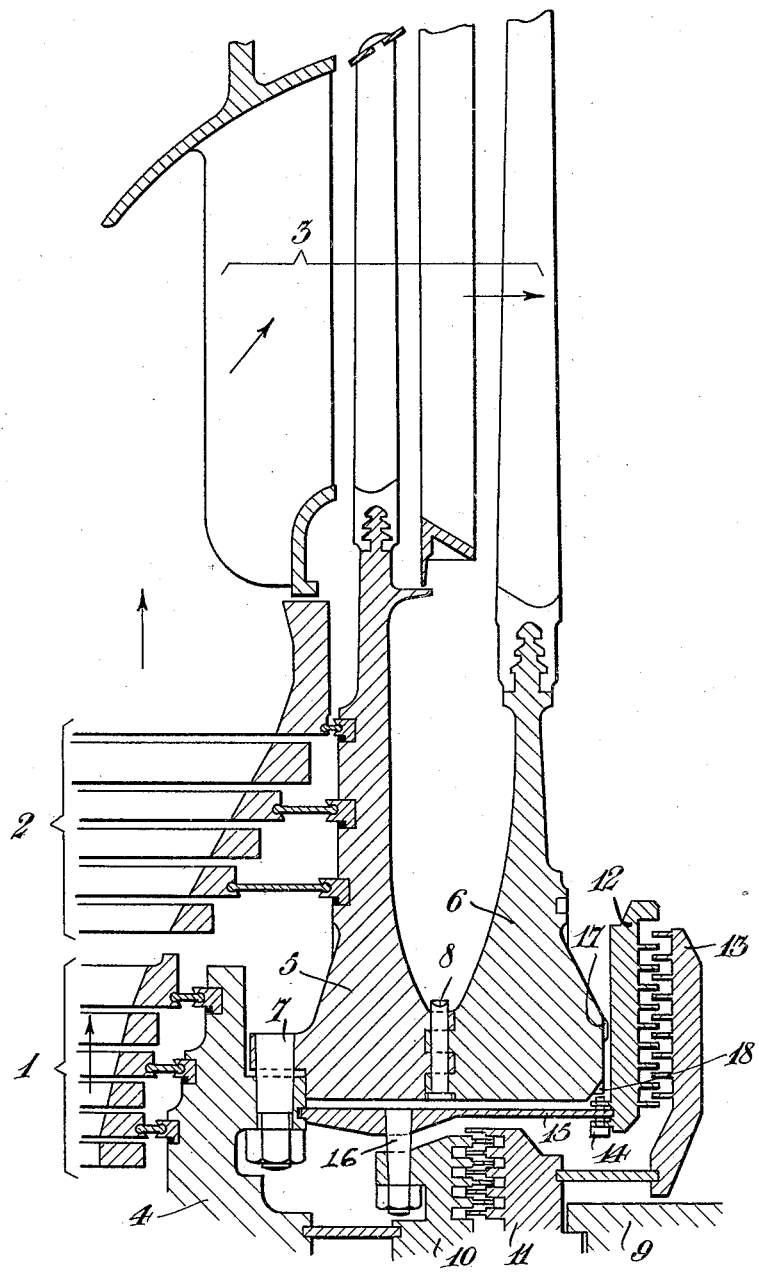

1,807,460

UNITED STATES PATENT OFFICE

OSCAR ANTON WIBERG, OF FINSPONG, SWEDEN

PACKING FOR USE BETWEEN ROTARY AND STATIONARY MACHINE PARTS

Application filed July 14, 1930, Serial No. 467,929, and in Sweden September 14, 1929.

This invention relates to steam or gas turbines or other machines in which a tight sealing is required between rotary and stationary disks or other machine-parts, and in which labyrinth packing elements or the like are used for this purpose, as for instance, in order to prevent a fluid contained in the machine from escaping between the disks. In such machines the disks will, according to the temperature of the fluid and the way in which the disks are attached to the machine, be subjected to the action of more or less great forces which may result in radial or axial deformations of the disks to such an extent as to cause the packing elements to touch each other.

The present invention has for its object to eliminate such deformations of the rotary disk of a packing of the above said kind.

The invention is characterized, chiefly, by the fact that the disk subjected to deformation is mounted with both radial and axial play relatively to a member of the machine which rotates synchronously with the disk but is not subjected to a similar deformation, the disk or said member or both being provided with abutments or other projections extending into the space representing said play. Said abutments or projections are of such a design as normally not to touch the opposite side of the space, but will touch said side due to a slight deformation of the disk so as thereby to prevent further deformation.

In the accompanying drawing one embodiment of the invention is illustrated as applied to a radial flow steam turbine. The drawing shows an axial section of such a small part of the turbine only as is required to illustrate the invention. Thus, the rotary system of the turbine is represented by parts of two sections 1 and 2 of the radial flow blade system and parts of the axial flow blade system 3 together with parts of the respective turbine disk sections 4, 5 and 6. Said disk sections are connected together by bolts 7, 8. The stationary system of the turbine is represented by part of the wall 9 of the steam chest. Inserted between the rotary turbine disk and the stationary steam chest is a labyrinth packing comprising a disk 10 connected to the turbine disk section 4 and a disk 11 secured to the steam chest 9. Said packing is adapted to prevent leakage of steam from the steam chest to the condenser, not shown. In order to obtain an increased sealing effect an additional labyrinth packing is provided outside the packing 10, 11 which comprises a rotary disk 12 and a stationary disk 13. The disk 12 is connected by bolts 14 to one end of a cylindrical wall 15 concentric with the turbine shaft which engages at its opposite end a groove formed in the turbine disk section 14 and is connected between its ends to the rotary labyrinth disk 10 by means of radial conical bolts 16. The disk 12 is situated at a given axial distance from the turbine disk section 6 and the wall 15 is situated at a given radial distance from the turbine disk sections 5 and 6. The object of the plays between the turbine disk and the labyrinth disk 12 or the wall 15 is to permit both axial and radial expansion of the disk 12 and the wall 15 due to heating or as result of the action of the steam pressure or the centrifugal force.

Assuming, for instance, that the turbine runs hot, that is to say, that the steam leaking through the labyrinth packing assumes a higher temperature than the normal one, then a deformation of the disk 12 would result. The same would be the case, if the steam pressure within the labyrinth were too high. The result would be a touching of the packing elements, if the deformation were allowed to proceed to an extent corresponding to the space between the turbine disk and the packing members 12 and 15. In order to prevent such an extended deformation and cause the deformation to take place in a given direction, the turbine disk 6 is provided with small abutments 17 and 18. Radial expansion of the wall 15 and the disk 12, due to heating or centrifugal forces, will cause the rivets 14 to finally engage the abutments 18, thereby causing the disk 12 and the wall 15 to maintain their circular shape and transmitting the radially acting forces to some extent to the disk 6. As a result, the disk 12 will be prevented from adjusting itself eccentrically in radial direction to such an extent as to allow the edges of the packing elements to touch each other. If, furthermore, an axial thrust is acting on the disk 12, then the disk will have a tendency of assuming a cup-like shape. This axial deformation, however, will be counteracted by the abutments 17, after the disk 12 has been brought into engagement therewith. In this way too great axial deformation of the disk 12 with the resulting risk of touching will also be prevented.

The abutments 17 should be located in close proximity to or in register with the centre of gravity of the section of the disk 12. The abutments should afford small contact surfaces in order to permit the slightest heat transmission possible. The abutments may be distributed peripherally at any desired distances and may be placed on the packing disk 12 instead of on the turbine disk without departing from the principle of the invention. The abutment 18 may engage the flange between the rivets 14 instead of the rivets themselves. In cold state there will always exist a certain play between the abutments and the opposite wall surface.

What I claim is:—

1. In a machine containing a fluid to be prevented from leaking out of the machine, the combination of a rotary disk subjected to forces tending to deform same, a nonrotary disk, packing elements between said disks, means to hold said rotary disk in such relation to a part of the machine rotating synchronously with said disk but not subjected to a similar deformation as to afford both axial and radial play between said disk and said machine part, and means adapted to be put into operation to limit said play after a slight deformation of the rotary disk.

2. In a machine in which packing elements are provided between a non-rotary disk and an annular rotary disk arranged concentrically to the machine axis, to prevent leakage of fluid contained inside the machine and in which said rotary disk is subjected to forces tending to deform same, the combination with said rotary disk of a cylindrical supporting member therefor carried by a rotary part of the machine and connected to the inner edge of said disk to support same, said supporting member being arranged with radial play inside a part of the machine not subjected to deformation, while said annular disk is arranged with axial play relatively to the same machine part, radial projections on said machine part to limit said radial play, and axial projections on said machine part to limit said axial play.

3. In a machine in which packing elements are provided between a non-rotary disk and an annular rotary disk arranged concentrically to the machine axis to prevent leakage of a fluid contained inside the machine, and in which said rotary disk is subjected to forces tending to deform same, the combination with said rotary disk of a cylindrical supporting member therefor, connected at one end to a rotary part of the machine and connected at its other end to said rotary disk, said supporting member being arranged with radial play inside a part of the machine not subjected to deformation, while said annular disk is arranged with axial play relatively to the same machine part, radial projections on said machine part to limit said radial play, and a set of axial projections on said machine part distributed on a circle substantially midway between the outer and inner edges of the rotary disk.

In testimony whereof I have signed my name.

OSCAR ANTON WIBERG.